United States Patent [19]
Wichterle

[11] Patent Number: 4,732,714
[45] Date of Patent: Mar. 22, 1988

[54] METHOD AND APPARATUS FOR CENTRIFUGAL CASTING OF CONTACT LENSES IN OPEN MOLDS

[75] Inventor: Otto Wichterle, Prague, Czechoslovakia

[73] Assignee: Ceskoslovenska akademie ved, Prague, Czechoslovakia

[21] Appl. No.: 718,401

[22] Filed: Apr. 1, 1985

[30] Foreign Application Priority Data

Apr. 20, 1985 [CS] Czechoslovakia ............ 2990-84

[51] Int. Cl.⁴ .................................... B29D 11/00
[52] U.S. Cl. ............................... 264/1.4; 264/2.1; 264/310; 425/174.4; 425/430; 425/808
[58] Field of Search ............ 264/2.1, 311, 310, 1.1, 264/1.4; 425/808, 434, 429, 174.4, 430

[56] References Cited

U.S. PATENT DOCUMENTS

| | | | |
|---|---|---|---|
| 3,408,429 | 10/1968 | Wichterle | 264/2.1 |
| 3,699,089 | 10/1972 | Wichterle | 337/21 |
| 3,822,089 | 7/1974 | Wichterle | 351/160 |
| 4,153,349 | 5/1979 | Wichterle | 351/160 H |
| 4,541,969 | 9/1985 | Neefe | 264/1.4 |

FOREIGN PATENT DOCUMENTS

| | | |
|---|---|---|
| 159359 | 7/1970 | Czechoslovakia . |
| 102783 | 7/1983 | Czechoslovakia . |
| 59084 | 1/1984 | Czechoslovakia . |
| 190384 | 3/1984 | Czechoslovakia . |
| 1065227 | 7/1984 | U.S.S.R. .............. 425/808 |

*Primary Examiner*—James Lowe
*Attorney, Agent, or Firm*—Dilworth & Barrese

[57] ABSTRACT

According to the method of the invention, molds charged with a monomer mixture are arranged into columns with precisely coaxial casting surfaces inside these columns, namely, in tubes of cylindric shape with openings only 0.01 to 0.03 mm larger the diameter of the outer cylindric surface of the mold or the diameter of a hypothetical cylindrical surface circumscribed to any other, preferably a parallel outer surface of the casting mold. The tube with the inserted column of molds is provided with airtight seals at both ends whereas at least one seal is provided with a valve for alternating evacuation and refilling with an inert gas. The invention also provides apparatus by which a complete sequence of required operations including column tilting and rotation is carried out with the tubes charged in this way until the polymerization is completed without transferring the molds from sealed tubes from one apparatus to another or into intermediate magazines.

5 Claims, 6 Drawing Figures

METHOD AND APPARATUS FOR CENTRIFUGAL CASTING OF CONTACT LENSES IN OPEN MOLDS

BACKGROUND OF THE INVENTION

This invention pertains to a method for centrifugal casting of contact lenses in open molds and to an apparatus for performing this method.

Casting of contact lenses in constantly rotating open molds was described for the first time in Czechoslovak Pat. Nos. 108,895 and 116,260 (counterpart to U.S. Pat. No. 3,408,429). The apparatus for performing this method consists of dishes which are rotated and carry molds inserted therein which are charged with a monomer mixture under the conditions of polymerization and in a stream of inert gas. This apparatus is subject to the disadvantage in that the inert gas strips volatile components of the polymerizing monomer mixture thus causing a lack of uniformity in the composition of the formed gel and, consequently, an undesirable deformation in the shape of the final product. This disadvantage is overcome in the procedure and apparatus described in Czechoslovak Pat. No. 159,359 in which molds charged with monomer mixture are coaxially arranged in continous vertical columns inserted into tubes. Each tube is provided with drived means for its constant rotation and an inlet for protective gas which streams along the column of molds disposed therein. When ultrathin lenses started to replace the massive and thick-walled soft contact lenses, insurmountable difficulties with the foregoing method were encountered. The casting of ultrathin lenses requires dosing of very small amounts of monomer mixture. It is impossible to evenly wet the entire useful casting surface up to its limiting circumferential edge in the completely inaccessible space between the grouped molds (as described in Czechoslovak Pat. No. 116,260). This problem is overcome, for example, in Czechoslovak patent application PV 1027-83, now Czechoslovak Certificate of Authorship No. 237,592, by an alternative method of casting in vertically rotating columns of molds. Here, the molds are introduced continuously into the rotating polymerization column from the top and, at the same time, the molds with polymerized lenses are gradually discharged from the bottom in contrast to charging and discharging the rotating polymerization column with molds all at once. Before introducing a mold into a column, monomer mixture is spread over the entire surface of the mold by a slow rotation of the steeply inclined mold, for example, by the method described in Czechoslovak patent application No. 590-84 now Czechoslovak Certificate of Authorship No. 247,723. In other respects, this very successful adaptation is subject to a disadvantage consisting of the necessity of carrying out the individual operations (dosing of the monomer mixture, a slow rotation of the mold in the inclined position and the polymerization itself) in individual items of equipment. The molds must be stored in magazines after performing each operation, such presenting the danger of attraction of dust particles to the strongly electrostatically charged surface of the molds. Incorporation of dust into the monomer mixture can result in a partial deterioration of the cast lenses. An even more serious shortcoming of this alternative procedure occurs with the polymerization of some very slowly polymerizing mixtures, for example, highly diluted mixtures, suitable for manufacturing highly swellable lenses. Passage of molds through the polymerization column must be slowed down to such an extent that the procedure becomes economically impractical. This problem is overcome in Czechoslovak patent application PV 1903-84 which provides for only a partial polymerization of the monomer mixture after passage of the molds through the column, the molds then being placed into magazines which do not rotate. However, this still increases the danger of contamination of the lens surface and also increases the need for manual attendance of the apparatus.

SUMMARY OF THE INVENTION

The above-mentioned shortcomings of the prior methods referred to are successfully eliminated or substantially reduced according to the present invention which consists in an arrangement of molds charged with a monomer mixture and formed into columns with the casting surfaces of the molds making up the columns being in precise coaxial alignment within tubes. The molds are guided due to the precise clearance of the tubes which are advantageously of a cylindrical shape of a diameter only 0.01 to 0.03 mm larger than the diameter of the outer cylindrical wall of molds or the diameter of a hypothetical cylindrical surface circumscribed to any other, preferably a parallel outer surface of the casting mold. The tube with the inserted column of molds is made airtight at both ends while at least one seal is provided with a valve for alternately evacuating the tube and refilling it with an inert gas. The complete sequence of necessary operations is carried out with the tubes charged in this way until a complete polymerization is attained without transferring the molds from the sealed tube in one apparatus to another or into intermediate magazines. The tube is adapted at its ends for these operations either by a precise grinding of the outer surface or by a firm attachment of flanges for the precise attachment of the tube to clamps, which are rotatably placed in coaxial bearings and provided with a drive for the required rotation. To carry out the first operation, i.e., a complete wetting of the casting surfaces, the bearings together with the drive of clamps are connected to a swinging base which may be manually or mechanically tilted in a predetermined manner, for example, by a cam or a pneumatic device, in such a way that the bearing axis and rotating parts can be deflected from the vertical position to as much as to the horizontal position or even somewhat behind the horizontal position as is similarly described in the operation according to Czechoslovak patent application PV No. 590-84, now Czechoslovak Certificate of Authorship No. 247,273 i.e., that the rotation rate is relatively low in this case, within limits of about 0.5 to 10 r.p.m., and the frequency of periodic tilting of the axis is still lower than is the rotation frequency. Immediately after this operation, the tube is brought into the vertical position and to constant higher revolutions which are required for the formation of a prescribed shape of rotating meniscus of the liquid mixtures, i.e., within the limits of 320 to 450 r.p.m. This may be achieved either by straightening the swinging bearings into the vertical position and a related adjustment in rotational speed or by removing the tube from the original position in the swinging bearings and similar fastening between two fast vertical bearings by means of clamps with a drive for the higher settable constant rotation. At the same time, a jacket is placed about the tube which contains sources for photochemically initiated polymerization, e.g., by short-wave light, or which may introduce a heating medium, for example, constantly heated air, to increase the temperature of the tube to the temperature required of thermally initiated polymerization. This second operation need not be carried out to attain complete conversion of the reaction mixture to the final gel. It is more advantageous to interrupt the rotation of the tube after a period sufficient to attain the so-called point of gelation where the viscosity of the mixture virtually attains its final value. This occurs according to the degree of crosslinking of the formed gel already at the conversion of several percent within time, which is a small fraction of the period necessary to attain practically complete conversion. The shape of the meniscus need not be maintained by rotation in this final stage so that the tubes may be removed and stored in any position under light or temperature conditions required for completion of polymerization even for several days, if necessary, without costly mechanisms and attendance.

First then, the seals of the tube are released and the molds are removed for a contingent inspection and for further common processing in the same way as in the earlier described method of production.

The apparatus for performing the method according to the invention consists of a set of tubes, advantageously made from glass, which opening is formed by parallel surfaces to guide precisely the casting molds provided with a concave casting surface and an outer vertical circumference surface, which molds fit slidably into the tube opening in such a way that they form at the mutual contact in the tubes a continuous column closing the concave surfaces in a precisely coaxial mutual position. The tubes are provided at both ends with airtight seals and precise flanges for the rotatable attachment of the tubes by means of clamps, which are revolvable in bearings, and their common axis merges with the common axis of the concave surfaces of molds closed in the fixed tubes or is parallel with the said axis to an adjustable distance smaller than 1.5 mm. A drive is adapted for the rotation of the tubes by an adjustable constant speed. The axis of the bearings, together with the axis of the rotatable parts guided by these bearings, can be swung from the extreme vertical direction to the extreme horizontal position and a jacket conducting a heating medium, advantageously heated air, or accommodating sources of a photochemically efficient, advantageously ultraviolet, radiation is adapted around the rotatable tubes.

BRIEF DESCRIPTION OF THE DRAWINGS

Throughout the following description, like reference numerals are used to denote like parts in the drawings.

DESCRIPTION OF THE PREFERRED EMBODIMENTS

Figure 1:
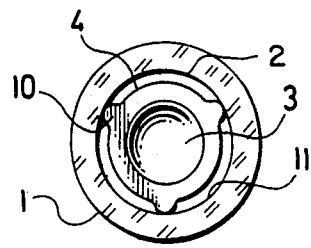
FIG. 1 is an axial view of a casting mold encircled by a glass tube.

FIG. 1 shows an example of a polypropylene casting mold 2 having a concave surface 3 and from the outer circumference surface 4 of whic projects horizontal strips 10, to which a circle 11 can be circumscribed, which has a diameter 0.02 mm smaller than the diameter of the precise cylindric inner surface of glass tubes 1 in which a column of the casting molds are received.

Figure 2:
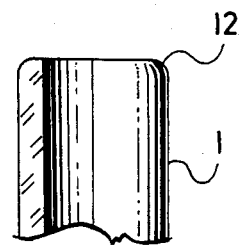
FIG. 2 is a fragmentary view of an end part of the glass tube, partly in section showing a rounded end surface thereof.

FIG. 2 shows how the outer surface of the end of glass tube 1 is rounded by grinding a rounded toroidal surface 12 thereon precisely coaxial with the cylindric opening of the tube.

Figure 3:
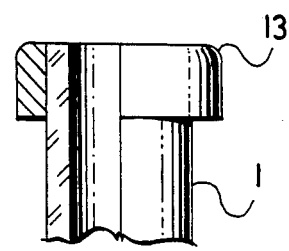
FIG. 3 is a view similar to FIG. 2 but showing a metal ring secured to the tube end, the metal ring having the rounded surface.

FIG. 3 shows another example of adaption of the ends of tube 1 by the precise cementing of a metal ring 13 thereto, the ring having a rounded end surface.

Figure 4:
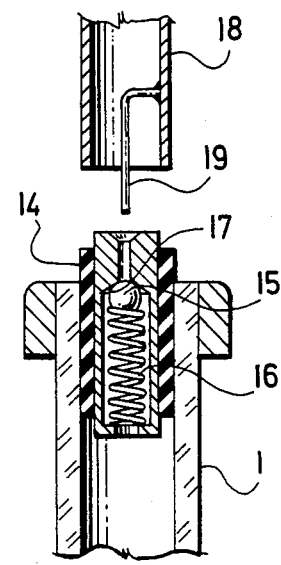
FIG. 4 illustrates the airtight seal used at the end of the tube and which allows for evacuating or charging the interior of the tube with protective gas.

FIG. 4 shows an the airtight seal of the ends of the tube effected with an elastic stopper 14 made from silicone rubber which is provided with a valve consisting of a steel ball 15 compressed with a spring 16 to a seat 17. A strong compression of conduit 18 to stopper 14 causes a needle 19 fixed in the tube 18 to push the ball away from the seat thus opening the valve. The interior space of tube 1 may be either evacuated or the evacuated conduit can be charged with a protective gas through the tube 18.

Figure 5:
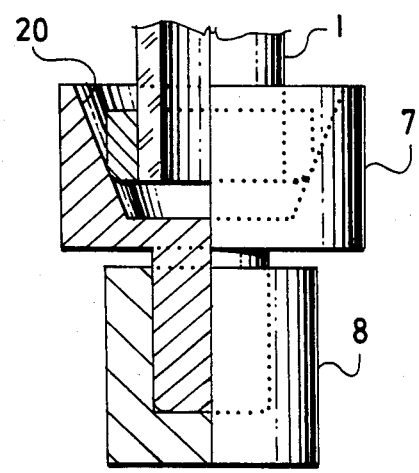
FIG. 5 is a fragmentary view, partly in section, showing a tube clamp and a bearing for supporting the tube clamp.

FIG. 5 shows, a clamp 7 which is revolvable in a sliding bearing 8 and provided with a hollow conic surface 20 on which the ends of tube 1, adapted according to FIG. 2 or FIG. 3, may be placed.

Figure 6:
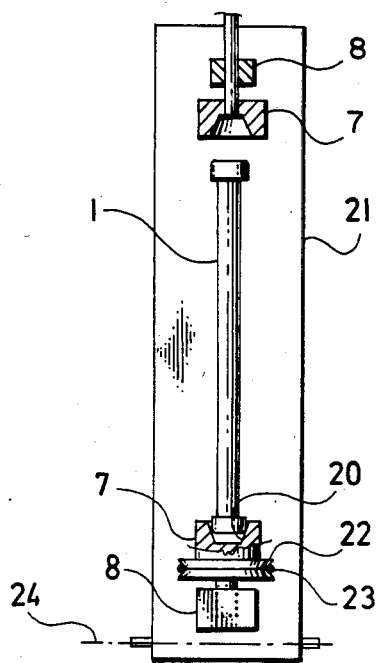
FIG. 6 is a view of the apparatus showing how the casting molds held in the glass tube are arranged for rotation of same during wetting of the casting surfaces and subsequent polymerization.

FIG. 6 shows an assembly of bearings 8, clamps 7 and tube 1, where it is seen that the upper symmetrically set bearing with the clamp 7 can be shifted on base plate 21 in the direction of the axis of bearings 8 so that tube 1, which slides into the conic hole 20 of the lower clamp, may be clamped in an exact position between both bearings by shifting the upper clamp with the bearing. Pulley 22, which is advantageously rotated by geared belt 23 driven by a conventional drive means, is fitted to the lower clamp to rotate the whole assembly. To carry out the first operation, i.e., wetting of casting surfaces with monomer mixture, the whole assembly with base plate 21 and the drive are rotatable around horizontal axis 24 thus enabling the tilting of the rotational axis to below the horizontal position. The same or completely identical apparatus can also be used for the subsequent polymerization where, however, the bearings with all attached parts remain in the fixed horizontal position and, in addition, the jacket for the stream of heated air or for sources of ultraviolet radiation is shifted to base plate 21 along clamped tube 1.

I claim:

1. A method for producing a contact lens which comprises:
   (a) providing a column of molds, each mold containing a polymerizable mixture therein, within a tube which provides a close fit with the column of molds, the tube being provided with airtight seals at each end;
   (b) alternately evacuating the tube and filling the tube with an inert gas to remove oxygen-containing gas from the tube;

(c) rotating the sealed tube at 0.5 to 10 revolutions per minute for from 2 to 10 minutes around the axis of the column of molds while periodically tilting the tube to an angle of 60° measured from above the horizontal plane to as much as 10° below the horizontal plane;

(d) rotating the tube in the vertical position at 300 to 450 revolutions per minute while subjecting polymerizable mixture within molds contained in the tube to polymerization-initiating energy until at least the gel state is achieved; and, (e) storing the sealed tube for a period to complete polymerization.

2. The method of claim 1 wherein the polymerization-initiating energy is UV radiation or heat.

3. The method of claim 1 wherein step (d) is carried out until more than 95% polymerization is achieved.

4. Apparatus for producing a contact lens which comprises:

(a) a tube with airtight seals at both ends, said tube accommodating in close-fitting relationship a quantity of molds containing polymerizable mixture;

(b) means for adjusting the angle of the tube from a vertical position to 10° below the horizontal plane;

(c) means for rotating the tube at a predetermined rate; and, (d) means for initiating the polymerization of the polymerizable mixture in molds contained in the tube.

5. The apparatus of claim 4 wherein means (d) is a source of UV radiation or heat.

* * * * *